United States Patent [19]

Seckendorf

[11] 4,286,854

[45] Sep. 1, 1981

[54] MAGNET-ACTUABLE FLASH APPARATUS

[75] Inventor: Bernard A. Seckendorf, Flushing, N.Y.

[73] Assignee: Wrist-A-Matic, Ltd., Elmhurst, N.Y.

[21] Appl. No.: 175,152

[22] Filed: Aug. 4, 1980

[51] Int. Cl.³ .................. G03B 15/02; G03B 15/03; G03B 9/10

[52] U.S. Cl. .................. 354/129; 354/133; 354/250

[58] Field of Search ............ 354/129, 133, 234, 235, 354/250, 253, 139, 147, 121

[56] References Cited

U.S. PATENT DOCUMENTS

| | | | |
|---|---|---|---|
| 1,989,109 | 1/1935 | Munder | 354/133 |
| 2,443,208 | 6/1948 | Thralls | 354/133 X |
| 3,507,196 | 4/1970 | Ruhle et al. | 354/139 X |
| 3,635,141 | 1/1972 | Starp et al. | 354/235 |
| 4,023,192 | 5/1977 | Simon et al. | 354/147 |
| 4,081,806 | 3/1978 | Seckendorf | 354/121 |

Primary Examiner—Donald A. Griffin
Attorney, Agent, or Firm—Jordan and Hamburg

[57] ABSTRACT

Magnet-actuable flash apparatus includes a light admission member having an aperture therein and a shutter member also having an aperture therein. The shutter member is movable relative to the light admission member for selective alignment of the apertures to permit the passage of light therethrough. A shutter member actuating member is adapted to move the shutter member between a first position in which the two apertures are out of alignment and a second position in which they are in alignment. A normally open switch, closable in response to the influence of a magnetic field, is adapted to be series connected in an electrical circuit with a source of electrical energy and an artificial light producing element. Permanent magnets are carried by the shutter member and the shutter member actuating member. One of such magnets selectively provides a magnetic field in such proximity to the switch in timed relation to the alignment of the apertures in the shutter member and the light admission member that the switch is caused to close and actuate the artificial light producing elememnt during at least a portion of the time when the apertures are in alignment.

16 Claims, 4 Drawing Figures

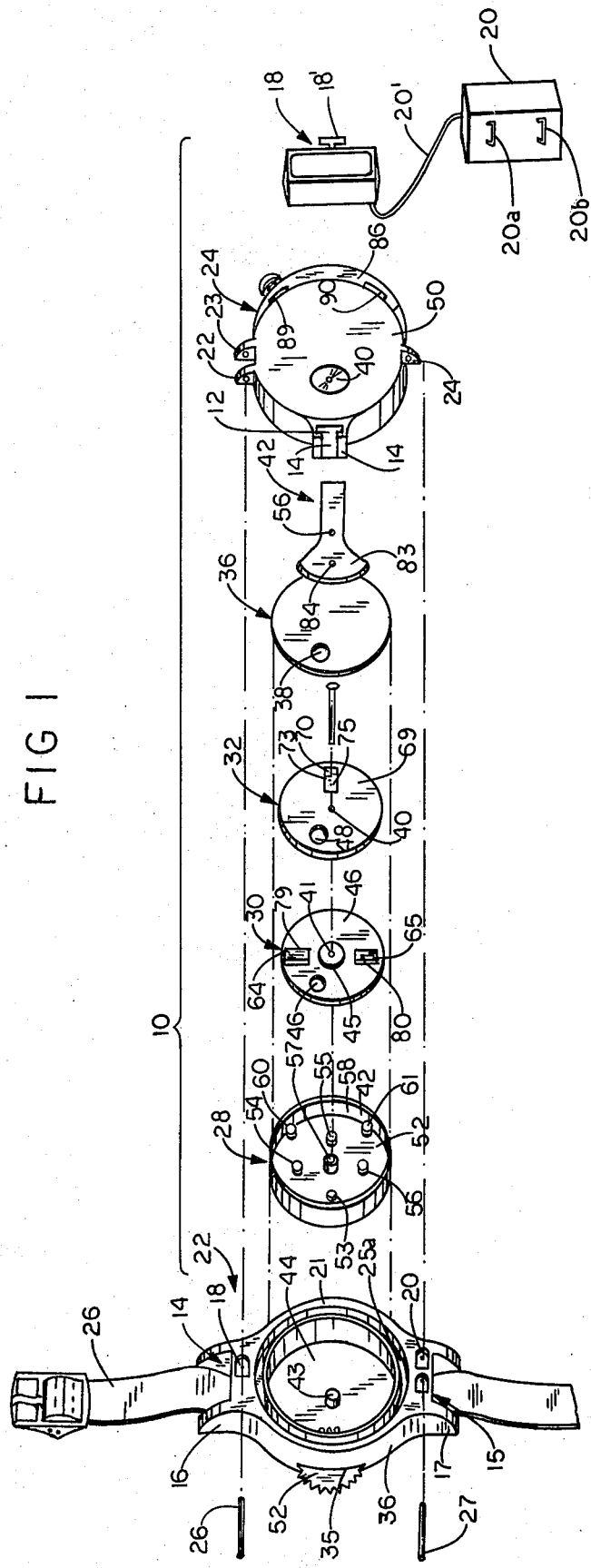

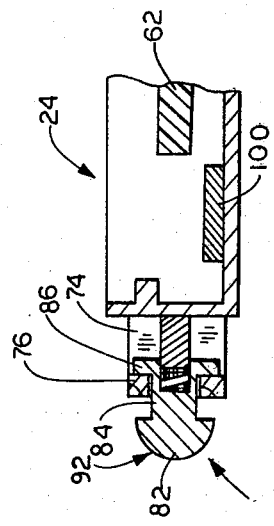
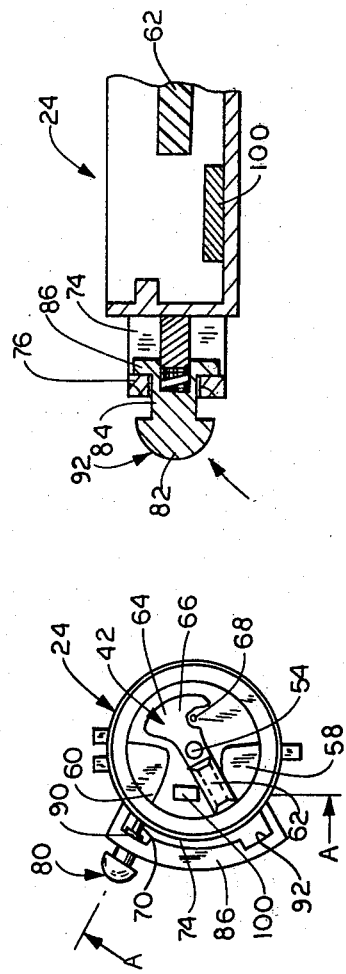
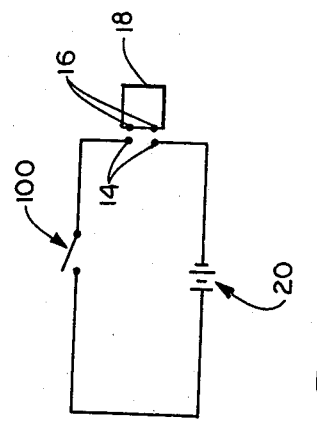

MAGNET-ACTUABLE FLASH APPARATUS

BACKGROUND OF THE INVENTION AND PRIOR ART STATEMENT

The present invention relates generally to photographic apparatus and more particularly to a mechanism whereby the opening of a shutter is synchronized with the actuation of a light emitting element. The invention has applicability to the synchronization of a camera shutter with a source of artificial illumination such as a flash lamp or the like. The invention has particular value with a camera in which the shutter is actuated by a shutter actuating member utilizing the phenomenon of magnetic repulsion between magnets carried by the shutter and shutter actuating members.

In the photographic field it has long been recognized that in order to obtain optimum results with ignition-type artificial illumination rather precise coordination between the opening of the camera shutter and generation of the artificial illumination is required. Various mechanisms for providing such synchronization of the shutter and light souce have been known heretofore. U.S. Pat. Nos. 1,989,109 issued Jan. 29, 1935 to R. I. Munder 2,443,208 issued June 15, 1948 to H. O. Thralls and 4,023,192 issued May 10, 1977 to Horst Simon et al. are representative of prior devices which employ a combination of movable mechanical elements and switches designed to ignite a flash element upon predetermined movement of the shutter member. Such mechanical structures function in a generally satisfactory manner; however, the mechanisms are relatively complex, the components are subject to considerable wear, and great reliance is placed upon spring elements which, through repeated use, are subject to failure due to fatigue. Time consuming maintenance and repair consequently is necessary in order to preserve the degree of synchronization intended between shutter movement and flash actuation.

In an effort to avoid at least the principal shortcomings of the prior mechanical devices, resort has been had to electronic synchronization devices. For example, Canadian Pat. No. 811,977 issued May 6, 1969 to AGFA-Gevaert Aktiengesselschaft discloses an arrangement for synchronizing the operation of a camera shutter and a source of artificial light. In accordance with the patented disclosure, an electronic circuit includes a thyristor and an induction coil connected in series and a diode connected in parallel across the coil. A light source is connectable in series with the electronic circuit. The coil is wound upon one pole of a horseshoe magnet and a pin made of ferromagnetic material is caused to move with the shutter member and to traverse the gap between the poles of the horseshoe magnet. The pin enters the gap when the shutter opens thereby changing the magnetic flux and resulting in the transmission of a positive voltage impulse by the coil which activates the electronic circuit completing the circuit to the light source. Although the arrangement does indeed overcome certain of the disadvantages inherent in mechanical synchronization systems, the introduction of electronic components increases original and replacement costs and requires a skilled mechanic to ascertain the reason for any malfunction and to then effectuate the repair and/or component replacement needed.

SUMMARY OF THE INVENTION

It is the principal object of the present invention to provide apparatus for the reliable synchronization of the opening of a shutter and the actuation of a light emitting element which is simple in construction and requires minimum maintenance.

It is another object of the invention to provide synchronization apparatus of the character described applicable to a shutter and shutter actuating mechanism operating on the principle of magnetic repulsion.

It is yet another object of the invention to provide synchronization apparatus for a camera in which the shutter is actuated magnetically by the shutter actuating mechanism which employs the magnets of either the shutter or the shutter actuating mechanism thereby requiring a minimum of additional components.

Other objects and advantages of the invention will become readily apparent to persons skilled in the art to which the invention pertains from the ensuing description of the invention.

BRIEF DESCRIPTION OF THE DRAWINGS

In order that the invention may be more fully comprehended, it will now be described, by way of example, with reference to the accompanying drawings in which:

FIG. 1 is an exploded perspective view showing a camera with a hot shoe thereon, embodying the features of the invention, in relation to a flash element in position to be operatively attached to the hot shoe of the camera;

FIG. 2 is a plan view of the open cover of the camera casing shown in FIG. 1 illustrating the shutter and the shutter actuating mechanism;

FIG. 3 is a cross-sectional view of the shutter mechanism shown in FIG. 2 and its relation to the flash-shutter synchronization feature of the invention;

FIG. 4 is a schematic electrical circuit diagram showing the electrical relationship between the electrical components of the synchronization system.

DETAILED DESCRIPTION OF THE PREFERRED EMBODIMENTS

Before explaining the invention in detail, it is to be understood that the invention is not limited in its application to the specific details of construction and arrangement of parts illustrated in the drawings since it is capable of other embodiments and of being practiced or carried out in various ways. It is also to be understood that the phraseology or terminology employed is for the purpose of description only and not of limitation. In the drawings, similar reference numerals designate similar parts throughout the several views.

Referring to the drawings, there is shown, identified generally by reference numeral 10, a camera. Although the camera selected for illustration is a wrist camera, it will be recognized that the invention has application to cameras generally as well as to other photographic apparatus in which a shutter member is movable relative to a light admission member and there is need to synchronize the opening of the shutter member with a source of artificial illumination.

As depicted in FIG. 1, camera 10 is provided with what is commonly known as a hot shoe 12. The hot shoe essentially provides the electrical interconnection between the flash element and the shutter member. The hot shoe therefore presents a pair of terminals 14 to which may be connected corresponding terminals presented by the hot shoe 18' of an electronic flash attachment 18. The construction of the hot shoe and flash attachment may take a variety of forms as is well known in the photographic field. As seen in FIG. 4, the terminals of the hot shoe and flash attachment are elements of the circuit. In order to effect the interconnection of the hot shoe and flash attachment, it has been known to provide cooperating track and rails on such components; however any arrangement which enables the electrical interconnection of the hot shoe and flash attachment would be suitable in the practice of this invention. The selection of the particular construction, therefore, is left to the discretion of those persons seeking to practice the invention. Further, it has been conventional to provide the flash attachment with a power pack 20 as an appropriate source of electrical energy. As seen in FIG. 1, the power pack 20 is electrically connected to the electronic flash 18 by means of conductor (wire) 20'. However, it is within the ambit of the invention to incorporate the power pack as part of the camera or flash attachment.

For purposes of illustration, the synchronization mechanism of the invention will be described as applied to a wrist camera as disclosed in U.S. Pat. No. 4,081,806, issued Mar. 29, 1978 to the present applicant. Accordingly, the disclosure of such patent in respect of the details of camera construction is incorporated herein by reference. In order to better facilitate an understanding of the present invention and avoid an unnecessary burdening of the present specification with details of construction having no direct relationship to the present invention, only such details of the camera construction as appear necessary for an understanding of this invention will be specifically described herein. As stated earlier, the synchronization mechanism of this invention has utility with cameras of other configurations and in the field of photography generally where coordination in timing between the opening of a shutter and actuation of a source of artificial light is required.

Turning to FIG. 1, it will be observed that wrist camera 10 includes a casing base 22 and a casing cover 24. A wrist strap 26 enables the camera to be worn upon the wrist of the intended user. Two rigid "loops" 20a, 20b are provided on the power pack 20 to permit the latter to be received on the strap 26 of the wrist strap 26. A film cassette container 28 and lower and upper covers 30, 32 for the cassette container are mountable for relative rotation by means of a pin 34. Disc-shaped member 36 is fixedly mounted within casing cover 24 and is given an aperture 38 therein, such aperture being in alignment with an opening in the end wall of the casing cover within which is positioned a lens 40. A shutter member 42 is pivotally mounted in casing cover 24 and is provided with an aperture 84 that is alignable with the aperture and lens in the casing cover as well as with apertures 46, 48 and 38 respectively formed in the lower and upper cassette container covers 30, 32 and in disc-shaped member 36. Protrusions are formed on the cooperating adjacent faces of the cassette container covers and on the disc-shaped member to permit the manipulation of such covers and the disc-shaped member to axially align apertures 46, 48 and 38. Once in alignment, shutter member 42 may be actuated in order to bring its aperture into momentary alignment with lens 40 for the admission of light into the camera to expose the selected portion of a disc of film mounted within the cassette container. Selective manual rotation of the disc of film and of the lower and upper cassette container covers is achieved through manipulation of a gear 52 carried rotatably by casing base 22 which is in meshing engagement with a gear carried on the base of the cassette container. For a more detailed description of the interrelationship between these components of camera 10, reference is made to U.S. Pat. No. 4,081,806.

Referring to FIGS. 2 and 3, it will be seen that shutter member 42 is pivotally mounted within casing cover 24 by means of pin 54 passing through aperture 56 therein. A pair of stop elements 58, 60, which may be formed integrally with the cover casing, are provided for defining the limits of pivotal movement of the shutter member. One portion of the shutter member is a permanent magnet 62. Such magnet is radially oriented so as to have one of its poles adjacent pin 54 and the other of its poles adjacent the periphery of the casing cover. As described in greater detail in U.S. Pat. No. 4,081,806, such other pole of the shutter magnet is given the same polarity as the pole of a permanent magnet carried by a shutter actuating assembly closest to the periphery of the casing so that the shutter member is urged by magnetic repulsion selectively against one of stop elements 58, 60. It will be observed that the portion of the shutter remote from the periphery of the casing cover is desirably in the form of an enlarged shutter leaf 64 having an aperture 66 formed therein. In FIG. 2, a portion of leaf portion 64 has been broken away to reveal opening or aperture 68 in the casing cover containing lens 40. Apertures 66 and 68 are equidistantly spaced from the axis of pin 54 so that they are alignable selectively through the actuation of the shutter member.

As stated earlier, the present invention has special utility with a camera in which the shutter member is actuated by means of a shutter actuating mechanism which causes movement of the shutter member through magnetic repulsion. Thus, as can be seen most clearly from FIGS. 2 and 3, a permanent magnet 70 is carried by a shutter actuating assembly 72 which is mounted for movement in a track 74. The track is defined between a pair of arcuate members 76, 78 which, as shown, may be affixed to the periphery of the casing cover. It will be appreciated, however, that other constructions for the formation of track 74 may be employed, including a recessed groove in the casing cover so that shutter actuating assembly 72 does not protrude beyond the face of casing cover 24. Nevertheless, as depicted, assembly 72 comprises a pin 80 having an enlarged head 82 and a shank 84. Shoulders 86, 88 are formed on the shank and serve to releasably lock the assembly in one of a pair of selected spaced notches 90, 92. A blind bore 94 is formed in shank 84 and magnet 70 is slidably received within the bore. A helical spring 98 is positioned within bore 94 so as to bias magnet 70 outwardly thereof and towards the periphery of the casing cover. Manual manipulation of the actuating assembly 72, as described in U.S. Pat. No. 4,081,806 thus results in the snapping of magnet 62 and the shutter member of which it is a part against one of stop elements 58, 60. During the pivotal movement of the shutter member, apertures 66 and 68 are brought into alignment for the admission of light to the interior of the camera and to the film disc. As stated previously, such pivotal movement of the shutter member results from the magnetic repulsion forces developed between the like poles of magnets 62, 70.

In accordance with the present invention, the interaction between the like poles of magnets 62 and 70 at the instant when apertures 66 and 68 are in alignment is utilized to activate a source of artificial illumination. More specifically, one of such magnets is employed to provide a magnetic field for a switch which is responsive to such a field, the switch being interposed in a circuit which includes the source of artificial illumination, so that when the apertures 66 and 68 are in alignment, the switch will close to complete the circuit and activate the light source. Referring to FIGS. 2 and 3, there is shown a switch member 100 actuable under the influence of a magnetic field and positioned within the casing cover 24 in proximity to the path of movement of magnet 62 on the shutter member such that when the shutter member is actuated to a position in which aperture 66 thereof is in alignment with aperture 68 of the casing cover end wall the magnetic field of the magnet 62 will actuate switch 100. It will, however, be appreciated that since the time required for currently available artificial light-producing elements to ignite and develop its rated lumen capacity is significantly less than the time during which apertures 66 and 68 will be in alignment the precise placement of the switch relative to the path of movement of the shutter member and magnet 62 affords some degree of latitude. As shown in FIGS. 2 and 3, the switch is conveniently mounted within casing cover 24 so as to be disposed in a plane above the plane of movement of the shutter member. It is also positioned a sufficient distance away from the periphery of the casing cover so as not to be influenced by the magnet 70 on the shutter actuating assembly 72. Thus, as will be recognized, when the shutter member is actuated so as to move to a pivotal position in which apertures 66 and 68 are in alignment the magnetic field of magnet 62 serves to actuate switch 100. It will be understood, further, that although the switch is depicted as being positioned above the plane of movement of shutter member 42, such switch may be mounted anywhere within or without the casing cover as will enable attainment of the desired interaction between the switch and the magnetic field of magnet 62.

The presently preferred switch member 100 constitutes a reed switch. Reed switches are of relatively simple construction and generally comprise flat reeds of ferro-magnetic material upon which electrical contacts of, for example, gold, silver, tungsten, rhodium or molybdenum are plated. In the most preferred form of the invention, the reed switch employed is of the normally open type. Thus, when the switch is exposed to the influence of the magnetic field of either of magnets 62 or 70, the flux of the magnetic field flows through the arms of the reeds so as to make each such reed arm a flux-carrying element in the magnetic circuit. When the magnetomotive force becomes sufficiently great to overcome the residual stiffness of the reed arms, the magnetic induction developed in the adjacent areas of the reed arms causes such arms to flex towards each other until the free ends of the arms snap into contact thereby closing the electrical circuit through the reed switch. Reed switches are readily available commercially and it is left to the discretion of those desiring to practice the invention to select the particular type of reed switch to be employed.

Referring to FIG. 4, there is shown an electrical circuit operative with the invention. It will be seen that such circuit includes a source of electrical energy 20 such as the power pack mentioned earlier, a magnetic field responsive switch 100, preferably a reed switch of the normally open type, and a flash element 18. The circuit components are series connected so that normally the circuit is open and closed only when switch 100 closes due to the influence of a magnetic field as explained previously. As also stated earlier, the flash element 18 interconnects electrically with a hot shoe 12 which may be integral to the camera. In any event, terminals 14 are associated with the hot shoe and terminals 16 are associated with the flash attachment.

While the invention has been particularly described with reference to certain specific embodiments thereof, it is to be understood that these embodiments are intended to illustrate rather than to limit the invention. Thus, for example, instead of a pivotable shutter member 40 mounted on a pin 54, it is within the ambit of the invention to modify the synchronization mechanism to the extent required for adaptation with a sliding blade type of shutter member. Moreover, actuation of the reed switch by a magnetic field is not limited to the magnetic field provided by the hereinabove disclosed two magnets. One or more other magnets may be provided in the camera and the magnetic field of any one thereof be utilized to actuate the reed switch. Just by way of example, it may be mentioned that, for the purposes of balance, the shutter may be in the configuration of a disc (having an aperture, of course) and, in addition to the magnet thereon which cooperates with the shutter actuating magnet for actuation of the shutter, additional magnets may be provided thereon to maintain a symmetrical weight distribution, the magnetic field of any one of which additional magnets being usable to actuate the reed switch. Other modifications and variations will be obvious to those skilled in the art, and it is intended that such modifications be included within the scope of the invention as defined by the appended claims.

What is claimed is:

1. Magnet-actuable flash apparatus comprising:
   a light-admission member having an aperture therein;
   a shutter member having an aperture therein and movable relative to said light-admission member for selective alignment of said apertures to permit the passage of light therethrough;
   means for actuating said shutter member between a first position in which said apertures are out of alignment and a second position in which they are in alignment;
   a normally open switch closable in response to the influence of a magnetic field and adapted to be series connected in an electrical circuit with a source of electrical energy and artificial light-producing means;
   and magnet means for providing a magnetic field in such proximity to said switch and in such timed relation to the movement of the shutter member relative to the light-admission member that said switch is caused to close and thereby activate said artificial light-producing means during at least a portion of the time when said apertures are in alignment.

2. Apparatus according to claim 1, wherein said magnet means are carried by said shutter member or said shutter member actuating means.

3. Magnet-actuable flash apparatus comprising:
   a light-admission member having an aperture therein;
   a shutter member having an aperture therein and movable relative to said light-admission member for selective alignment of said apertures to permit the passage of light therethrough;

means for actuating said shutter member between a first position in which said apertures are out of alignment and a second position in which they are in alignment;

a normally open switch closable in response to the influence of a magnetic field and adapted to be series connected in an electrical circuit with a source of electrical energy and artificial light-producing means;

and magnet means for providing a magnetic field in such proximity to said switch and in such timed relation to the movement of the shutter member relative to the light-admission member that said switch is caused to close and thereby activate said artificial light-producing means during at least a portion of the time when said apertures are in alignment, said magnet means being carried by said shutter member or said shutter member actuating means, said flash apparatus including a camera having a casing, said light-admission member comprising an end wall of said camera casing, a lens being mounted in the aperture of said end wall, said shutter member being pivotally mounted within said casing and said shutter member actuating means being movable along a portion of the periphery of said casing, at least a portion of said shutter member being a permanent magnet with one pole thereof adjacent the periphery of said casing and the other pole thereof remote from the periphery of the casing, said shutter member actuating means including a permanent magnet having one pole thereof maintained in proximity to the periphery of the casing and the other pole thereof remote from the casing periphery, said one pole of said shutter member magnet and said one pole of said shutter member actuating means being like poles, whereby the shutter member is actuated by magnetic repulsion forces between said like poles when the shutter member actuating means magnet is moved into proximity of the magnet of said shutter member and the apertures of said end wall and shutter member are caused to become aligned.

4. Apparatus according to claim 3, wherein said switch is a reed switch.

5. Apparatus according to claim 4, wherein said reed switch is fixed to said casing at a location proximate to the mid-point of the range of pivotal movement of said shutter member so as to be actuable by the magnetic field of the magnet thereof and remote from the path of movement of said shutter member actuating means so as not to be influenced by the magnetic field of the magnet thereof in all positions of said shutter member actuating means throughout its path of movement.

6. Apparatus according to claim 5, wherein said reed switch is positioned in a plane which is spaced from the plane of movement of said shutter member.

7. Apparatus according to claim 5, wherein the camera comprises a wrist-type camera and said casing includes a cylindrical side wall and opposed circular end walls, said apertured end wall being one of said circular end walls.

8. Apparatus according to claim 7, wherein said shutter member is pivotable about an axis which is concentric with said casing and the magnet thereof is radially oriented.

9. Apparatus according to claim 4, wherein said reed switch is mounted adjacent the periphery of said casing at a location remote from the magnetic field of said shutter member magnet in all positions of said shutter member throughout its path of movement, said switch being actuable by the magnetic field of said shutter member actuating means magnet when the shutter member has been magnetically repelled to a position in which the apertures of the casing end wall and shutter member are in alignment.

10. Apparatus according to claim 9, wherein the camera comprises a wrist-type camera and said casing includes a cylindrical side wall and opposed circular end walls, said apertured end wall being one of said circular end walls.

11. Apparatus according to claim 10, wherein said shutter member is pivotable about an axis which is concentric with said casing and the magnet thereof is radially oriented.

12. Apparatus according to claim 3, including a source of electrical energy and artificial light-producing means in a series connected electrical circuit with said switch.

13. Apparatus according to claim 12, wherein said artificial light-producing means comprises an electronic flash member.

14. In a flash actuation system for a camera having a first aperture for passing light, a movably mounted shutter having a second aperture in alignment with said first aperture at a first position of the shutter and out of alignment with said aperture at a second position of the shutter, and means for moving the shutter between said first and second positions; the improvement wherein said flash actuation system comprises a switch having contacts adapted to be displaced with respect to one another in a magnetic field, for controlling a flash, and magnet means mounted to be relatively movable with respect to said switch upon movement of said shutter, whereby the contacts of said switch have different relative positions with respect to one another at said first and second positions of said shutter.

15. The flash actuation system of claim 14 wherein said magnet means comprises a magnet mounted on said shutter for movement therewith, and said switch is mounted to said camera in a position to be in fields of different magnetic strength of said magnet in the first and second positions of said shutter.

16. The flash actuation system of claim 15 wherein said shutter is centrally pivoted with said second aperture and magnet means spaced from one another in the circumferential direction of the shutter, and said switch comprises a reed switch mounted on said camera in a fixed position with respect to said shutter.

* * * * *